(12) United States Patent
Zenz et al.

(10) Patent No.: US 8,051,209 B2
(45) Date of Patent: Nov. 1, 2011

(54) MINIMIZING CONFLICTS WHEN SYNCHRONIZING INTERRELATED DATA BETWEEN TWO SYSTEMS

(75) Inventors: Eric McQuaid Zenz, Seattle, WA (US); Aswan Prasad, Bellevue, WA (US); Rajendra H. Vishnumurty, Bellevue, WA (US); Alexander Joseph Pope, Seattle, WA (US); Alice Steinglass, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 358 days.

(21) Appl. No.: 12/324,272

(22) Filed: Nov. 26, 2008

(65) Prior Publication Data

US 2010/0131587 A1 May 27, 2010

(51) Int. Cl.
*G06F 15/16* (2006.01)
*G06F 15/173* (2006.01)
(52) U.S. Cl. .......................... 709/248; 709/224
(58) Field of Classification Search .................. 709/248, 709/224
See application file for complete search history.

(56) References Cited

U.S. PATENT DOCUMENTS

| | | | |
|---|---|---|---|
| 5,634,056 A | 5/1997 | Casotto | 395/619 |
| 5,926,816 A * | 7/1999 | Bauer et al. | 1/1 |
| 6,295,541 B1 * | 9/2001 | Bodnar et al. | 1/1 |
| 6,393,434 B1 * | 5/2002 | Huang et al. | 1/1 |
| 6,947,948 B2 | 9/2005 | Wang et al. | 707/102 |
| 7,324,999 B2 | 1/2008 | Judd | 707/101 |
| 7,653,749 B2 * | 1/2010 | Coleman et al. | 709/246 |
| 7,702,802 B2 * | 4/2010 | Stillion et al. | 709/229 |
| 2004/0019614 A1 * | 1/2004 | Wang | 707/202 |
| 2004/0225731 A1 * | 11/2004 | Piispanen et al. | 709/224 |
| 2006/0085485 A1 * | 4/2006 | Shimshoni | 707/200 |
| 2006/0190500 A1 * | 8/2006 | Rao et al. | 707/203 |
| 2006/0277223 A1 * | 12/2006 | Gupta et al. | 707/201 |
| 2007/0019683 A1 * | 1/2007 | Kryzyanowski | 370/503 |
| 2007/0180075 A1 * | 8/2007 | Chasman et al. | 709/223 |
| 2007/0255763 A1 * | 11/2007 | Beyerle et al. | 707/201 |
| 2008/0034012 A1 | 2/2008 | Novik et al. | 707/203 |
| 2008/0052322 A1 | 2/2008 | Gusciora | 707/200 |
| 2009/0055464 A1 * | 2/2009 | Multer et al. | 709/201 |
| 2009/0112986 A1 * | 4/2009 | Caceres | 709/204 |
| 2009/0164667 A1 * | 6/2009 | Zhang et al. | 709/248 |

OTHER PUBLICATIONS

LAB 49; Adobe AIR: Synchronizing SQLite Databases with the Server http://blog.lab49.com/archives/1569; Nov. 19, 2007; 2 pages.
Microsoft; Tracking Changes in Project 2007 http://blogs.msdn.com/project/archive/2006/04/06/tracking-changes-in-project-2007.aspx; Apr. 6, 2006; 5 pages.

(Continued)

*Primary Examiner* — Hieu Hoang
(74) *Attorney, Agent, or Firm* — Merchant & Gould P.C.

(57) ABSTRACT

A method is presented for resolving conflicts between interrelated data on a client computer and a server computer. Information for one or more tasks stored on a client computer is published to a server computer. When one or more of the tasks are edited, at least one bit is set in a data structure for each task in which a task attribute is changed. When a sync operation is performed, tasks on the client computer are compared with a task list from the server computer. If any of the bits in the data structure for the task are set, and the date and time that the task was last modified on the server computer is later than the date and time that the client computer last initiated a sync operation, the user is alerted to a conflict in the task and is permitted to manually resolve the conflict.

18 Claims, 7 Drawing Sheets

OTHER PUBLICATIONS

Synchronizing with Windows SharePoint Services, Part 1 http://www.topxml.com/rbnews/XML/re-76319__Synchronizing-with-Windows-SharePoint-Services--Part-1.aspx; Jan. 21, 2008; 4 pages.

XML—Managing Data Exchange/SyncML accessed at: http://en.wikibooks.org/wiki/XML-Managing_Data_Exchange/SyncML, accessed on Aug. 27, 2008, 9 pages.

* cited by examiner

MINIMIZING CONFLICTS WHEN SYNCHRONIZING INTERRELATED DATA BETWEEN TWO SYSTEMS

BACKGROUND

Task management application software gives users the ability to manage projects in an efficient and effective manner. A project manager can organize a project into tasks, assign tasks to specific users and allocate resources for tasks. Tasks management software can control the flow of work, link interrelated tasks and help ensure that project deadlines are met.

Task management information can be stored on two or more computer systems that share interrelated data. When these systems permit updates to the same data, conflicts may arise, especially when the interrelated data contains serially related tasks. For example, if a user on one system changes the start date for a task, the start and completion dates for interrelated tasks may also change. These transitive changes may be perceived as conflicts by some systems.

SUMMARY

Embodiments of the invention are directed to resolving conflicts between interrelated data on a client computer and a server computer. As described herein, information for one or more tasks stored on a client computer is published to a server computer. The information includes one or more attributes for each task and a unique client computer task management application identifier for the task. When one or more of the tasks are edited, at least one bit is set in a data structure, typically a bitmask, for each task in which an attribute is changed. When a synchronization operation is performed on the client computer, a list of tasks stored on the server computer is obtained by the client computer. For each task in the list of tasks, a determination is made as to whether the server computer identifier for the task maps to the client computer identifier for the task. If there is a map, a determination is made as to whether the task exists on the client computer. If the task does not exist on the client computer and the task has not been updated on the server computer since the last synchronization operation, a request is sent from the client computer to the server computer to delete the task from the server computer. If there is not a map, a new task is created on the client computer corresponding to the task that does not map.

If the task does map to a task on the client computer and the task exists on the client computer, a determination is made if any of the bits in the data structure for the task are set. If any of the bits in the data structure for the task are set, and the date and time that the task was last modified on the server computer is earlier than the date and time that the client computer last initiated a sync operation, task information is sent to the server computer for each task in which any of the bits in the data structure for the task are set. If any of the bits in the data structure for the task are set, and the date and time that the task was last modified on the server computer is later than the date and time that the client computer last initiated a sync operation, the user is alerted to a conflict in the task and is permitted to manually resolve the conflict.

The details of one or more techniques are set forth in the accompanying drawings and the description below. Other features, objects, and advantages of these techniques will be apparent from the description, drawings, and claims.

DETAILED DESCRIPTION

The present application is directed to systems and methods for resolving conflicts when synchronizing interrelated data stored on two computer systems. The systems and methods separate actual changes (e.g. a user changing the start date for a task) from transitive changes (e.g. a task's start date changing because the start date of a predecessor task changed), provide automatic resolution of transitive changes and alert users to conflicts in actual changes. A conflict occurs as a result of changes to the same data in both systems.

Figure 1:
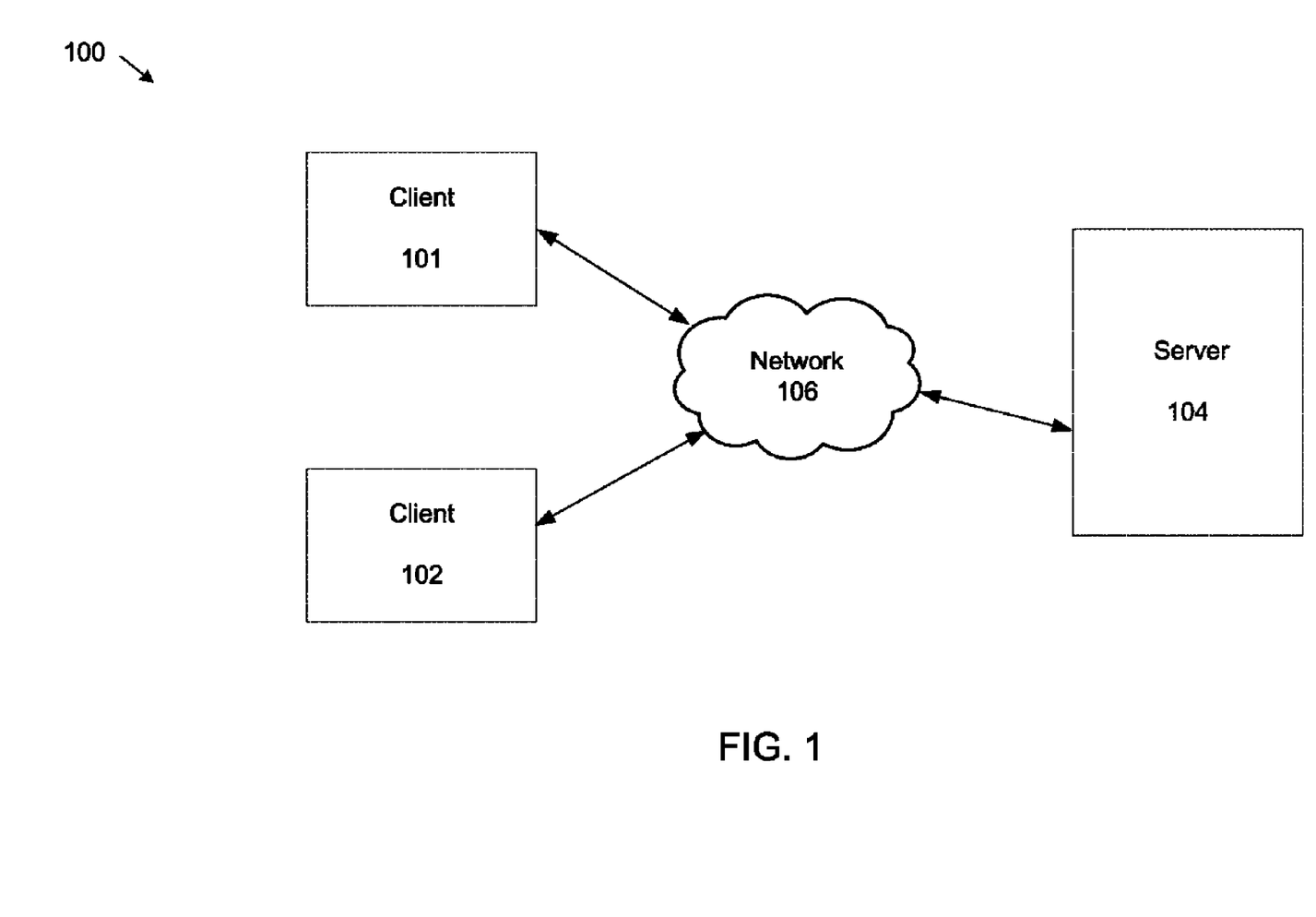
FIG. 1 shows an example system for resolving conflicts when synchronizing interrelated data stored on two computer systems.

FIG. 1 shows an example system 100 for resolving conflicts when synchronizing interrelated data stored on two computer systems. The example system 100 includes clients 101 and 102, a server 104 and a network 106.

Typically, one client computer, for example client computer 101, runs a task management application software program in which projects are organized into interrelated tasks. An example project management system that runs task management application software is Microsoft Project 2007 from Microsoft Corporation of Redmond, Wash. Typically, the server computer runs a browser-based collaboration and document-management software program such as Windows Sharepoint Services (WSS), also from Microsoft Corporation. Typically, example client 102 uses a web browser across network 106 to access project management task lists stored via WSS on server 104.

An example task management application may contain many interrelated tasks. One or more tasks may include dependencies on predecessor tasks. For example, task B may not be permitted to start until task A is completed. Similarly, task E may not be permitted to start until each of tasks B, C and D are completed. If the task date of a dependent task is delayed, for example because the start date of a predecessor task was delayed or because the duration of a predecessor task was increased, the completion date of the dependent task is also delayed. This delay may affect the start and completion dates of additional tasks.

A task management application such as Microsoft Project 2007 is typically controlled by one person, for example, a project manager. However, it is desirable for team members to be able to access tasks assigned to them and to update projected completion dates and percent complete status for those tasks. An online collaboration program like Windows Sharepoint Services permits task lists to be stored on a server computer, for example server 104, so that users, for example a user on client 102, can access the task lists and make changes to them when appropriate. Any changes made by the project manager or by team members need to be synchronized between client and server and actual conflicts need to be resolved. An example of an actual conflict is if both the project manager and a team member assigned to a task change the start date or the duration for the same task.

Figure 2:
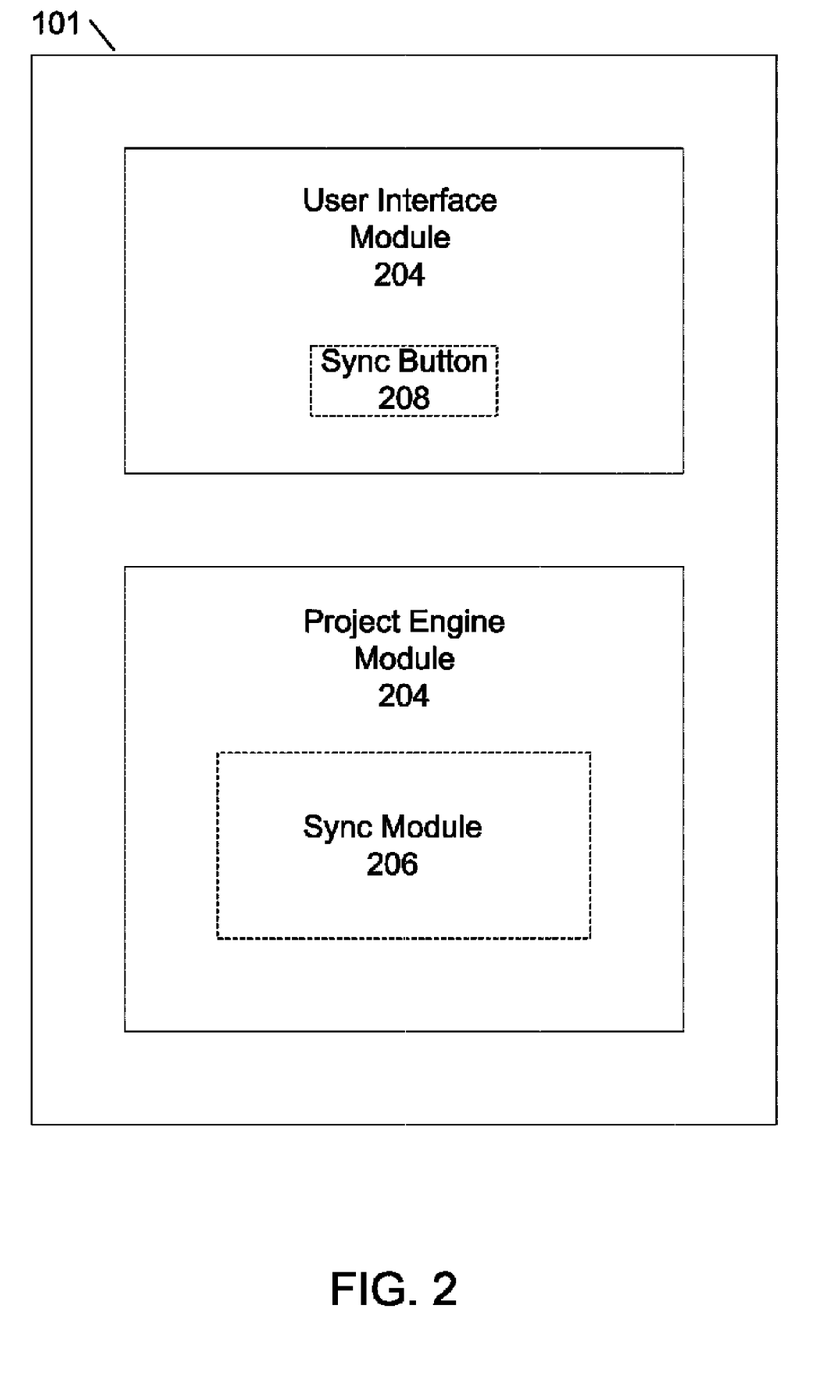
FIG. 2 shows modules of an example client computer that runs project management software and that interfaces with a document collaboration system.

FIG. 2 shows an example client computer 101 that runs task management application software in a project management system like Microsoft Project 2007. The example client computer 101 includes an example user interface module 202 and an example project engine module 204. Included within the example project engine module 204 is an example sync module 206.

The example user interface module 202 permits a user to enter project entities like tasks, resources and assignments into the project management system. The entities are typically stored in tables, so that there typically would be a table for tasks, a table for resources and a table for assignments. Associated with a project task are one or more attributes related to the task. The attributes correspond to columns in the task table. Some example attributes are the name, owner, start date, completion date, project duration and status of a task. Each task also has a unique project identifier to identify the task.

A user may choose attributes from a plurality of attributes made available in the example project management system. The example user interface module 202 permits the user to select one or more of these or available attributes and associate the attributes with a task. The example user interface module 202 also permits the user to select one or more attributes made available on the server computer for each task. Server attributes typically include the name, owner, start date, completion date, project duration and status of a task. The result is a set of client and server attributes associated with each task that are monitored by the task management system.

The example project engine module 204 provides a software engine that runs the project management system. One or more tasks may be linked to other tasks in a parent/child relationship. One or more tasks may have a predecessor or successor relationship with other tasks. When a start date or task duration changes for a task, the example project engine module 204 calculates the resulting start dates and end dates of all linked tasks and updates the dates for those tasks in the project management system.

The example sync module 206 controls the synchronization of tasks between the client computer 101 and the server computer 104. The sync module 206 also includes changelists and bitmasks for each task. A changelist is a list of attributes for each task that may be synchronized between the client computer 101 and the server computer 104. The changelist corresponds to the client and server attributes for the task selected by the user via user interface module 202. A bitmask is a data structure that includes a bit for each attribute in the changelist. A bit is set in the bitmask when the corresponding attribute changes on the client computer 101. The sync module 206 uses the bitmasks to determine which attributes have changed on the client computer 101 so that these attributes can be synchronized with corresponding attributes on the server computer 104.

Figure 3:
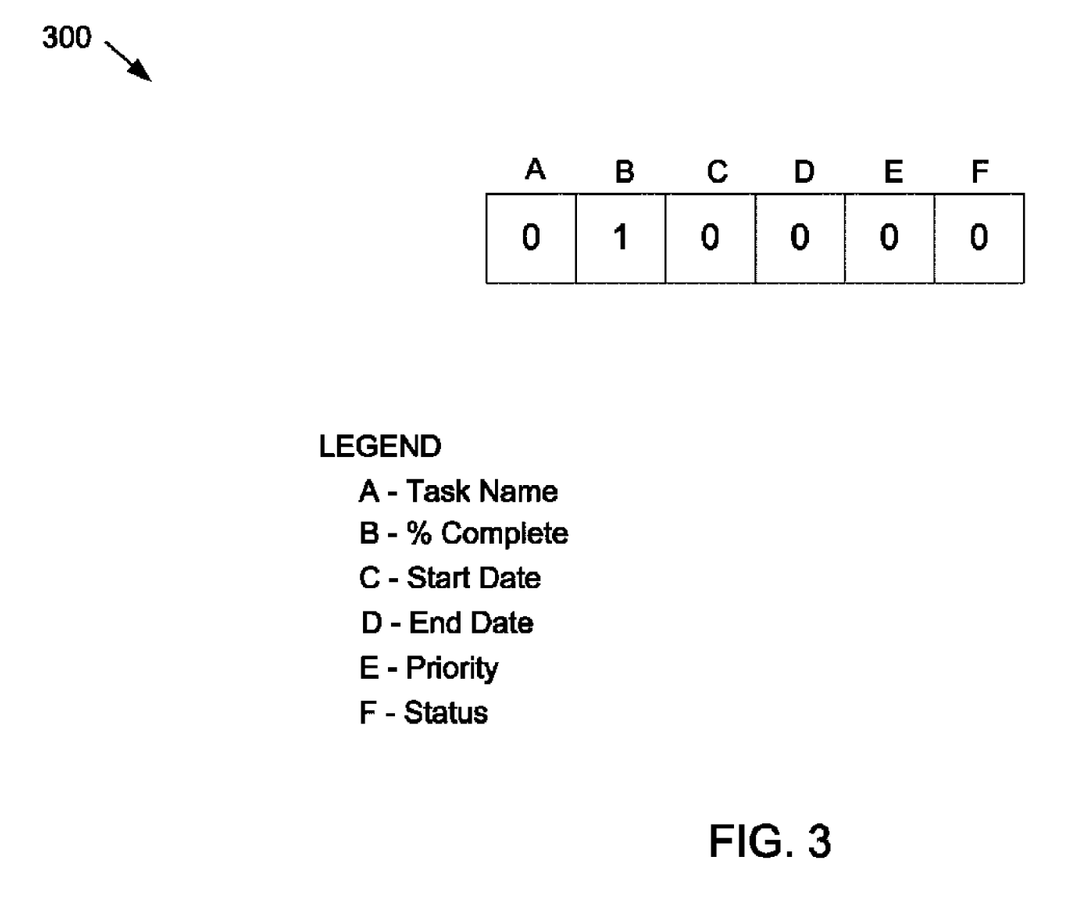
FIG. 3 shows an example bitmask used in an example system for resolving conflicts.

FIG. 3 shows an example bitmask for a task. This example bitmask includes the attributes task name, % complete, start date, end date, priority and status. Each bit in each bitmask is initially set to 0. When one of these attributes changes, the sync module 206 sets a corresponding bit in the bitmask to a 1. For example, the bitmask in FIG. 3 has the "B" bit set to a 1, indicating that the % complete for the task has been updated.

When a changelist and its associated bitmask are created for a task, the sync module 206 registers the changelist and bitmask with the example project engine module 204. When a user edits a task via the user interface module 202 and commits the edits, a bit is set in the task bitmask for all attributes that are changed. The sync module 206 is notified of the attribute changes.

When a user completes the initial entry of a project into the project management system, the project management system publishes the attributes for each entered task to the server 104. One of the attributes that is stored on the server 104 is the unique client computer task management application identifier for each task, for example, the Microsoft Project ID for the task. The tasks are stored in a task list on server computer 104 and each task is assigned a unique server computer application identifier, for example the WSS ID for the task. The unique client computer task management application identifier for each task and the unique server computer application identifier for each task are mapped and stored in both the client computer 101 and the server computer 104.

Once a task list for a project is published on server computer 104, a user on network 106, for example a user on client computer 102, can access the task list and make changes to task attributes, assuming the user has the authorization to make those changes. For example, a user on client computer 102 can change the percent completion or the status of a task. A user may also create one or more new tasks on server computer 104. A timestamp is stored on the server computer 104 as a task attribute for whenever a task list is updated.

In order to synchronize changes between client computer 101 and server computer 104, client computer 101 periodically performs a sync operation. The sync operation is typically initiated via user interface module 102 by clicking an example synchronization button, for example Sync button 208, on user interface module 202.

During the sync operation, the client computer 101 downloads the list of tasks from server computer 104. The task list includes columns that correspond to the attributes for each task. The unique client computer task management application identifier and the unique server computer application identifier for each task are included in the attributes obtained from server computer 104 for each task. For each task in the task list, the sync module 206 determines whether there is a task on client computer 101 with the same unique client computer task management application identifier. If there is not a task on client computer 101 with that client computer task management application identifier, it is an indication that the task was deleted from client computer 101. If the task has not been updated on the server computer since the last sync operation, the task is deleted from the task list on server computer 104. However, if the task has been updated on the server computer since the last sync operation, a conflict situation occurs. In example embodiments, a dialog box is displayed from which the user can resolve the conflict. In addition, if a task has been deleted from the server computer 104 but not from the client computer 101, a conflict situation also occurs and the user is given a chance to recreate the task on the server computer 104.

If an example task on a task list downloaded from server computer 104 has a server computer application identifier, for example a WSS identifier, but does not have a corresponding client computer task management application identifier, it is an indication that a user added a new task to server computer 104. In this case, project engine module 204 creates a new task on client computer 101 and copies the attributes for the task.

If a task in client computer 101 has a client computer task management application identifier that matches the server computer application identifier downloaded for the task from server computer 104, the sync module 206 obtains the bitmask for the task and determines if any bits are set. If one or more bits in the bitmask are set, indicating that one or more attributes have changed since the last sync operation, the sync module 206 checks the timestamp attribute for the task downloaded from server computer 104. If the task was modified on server computer 104 before the last sync operation, it is an indication that new changes only occurred on client computer 101. Therefore, these changes can be uploaded to the server computer 104 with no conflict.

If the task was modified on server computer 104 after the last sync, it is an indication that changes were made both on client computer 101 and server computer 104 since the last sync operation. In this case, the sync module 206 flags the attributes set in the bitmask for the task as conflicts. In example embodiments, the user interface module 204 displays a dialog box to the user so that the user can resolve the conflict.

Figure 4:
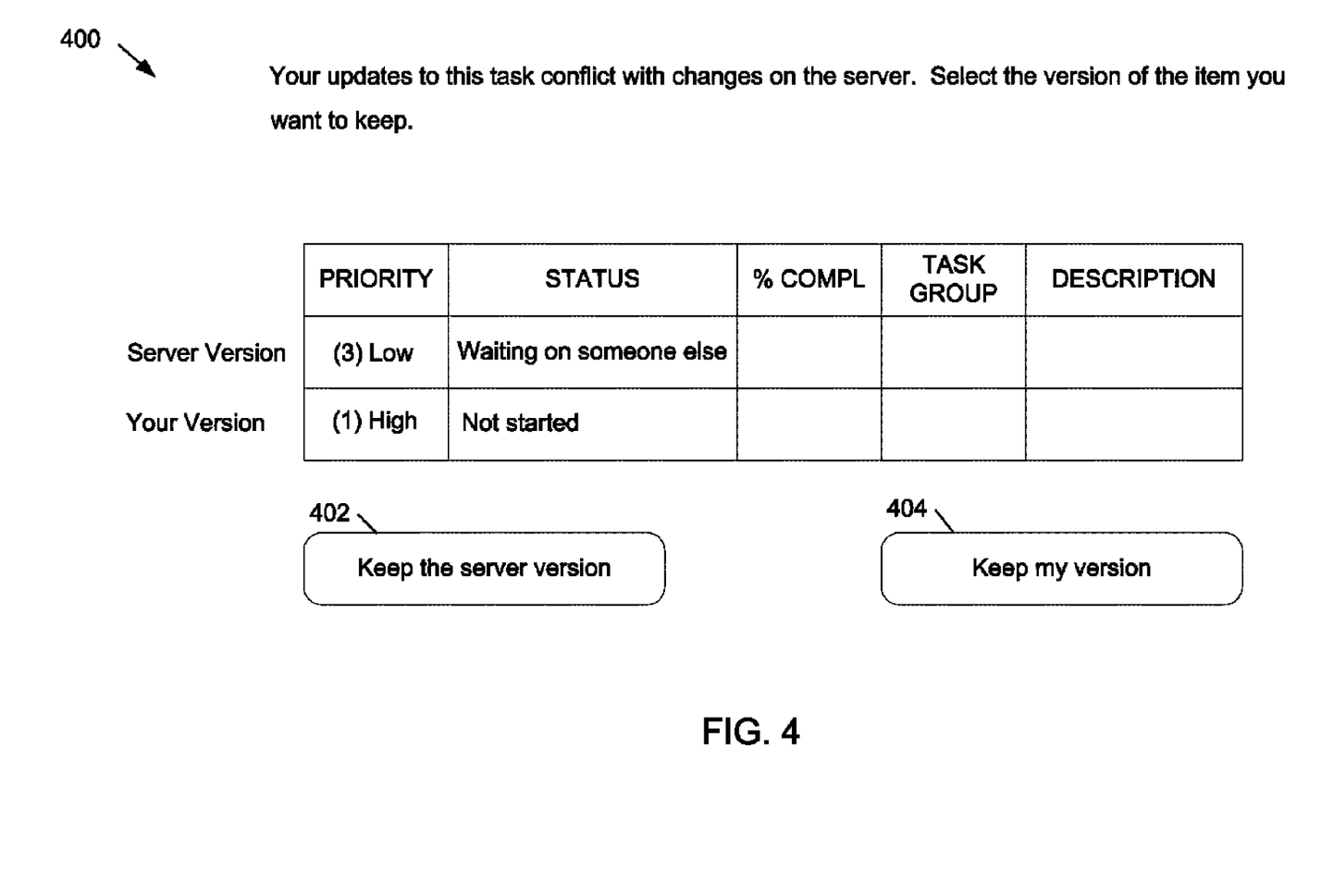
FIG. 4 shows an example dialog box displayed to a user on a client computer for displaying and resolving conflicts between tasks.

FIG. 4 shows an example dialog box for task conflict resolution. In this example dialog box, the version of a task on the server has a priority of 3 with a status of "Waiting on someone else". A task on the client has a priority of 1 with a status of "Not Started". A user can click on example button 402 to keep the server version or example button 404 to keep the client version.

In some embodiments, the sync operation can be initiated from the server computer as well as from a client computer. In other embodiments, the project management application can be stored on a server computer and a sync operation can be initiated from this server computer. In still other embodiments, a file sharing program can be stored on a client computer. For this embodiment, a sync operation can be initiated from a client computer storing the project management application to a client computer running a file sharing program. Other configurations are possible.

Figure 5:
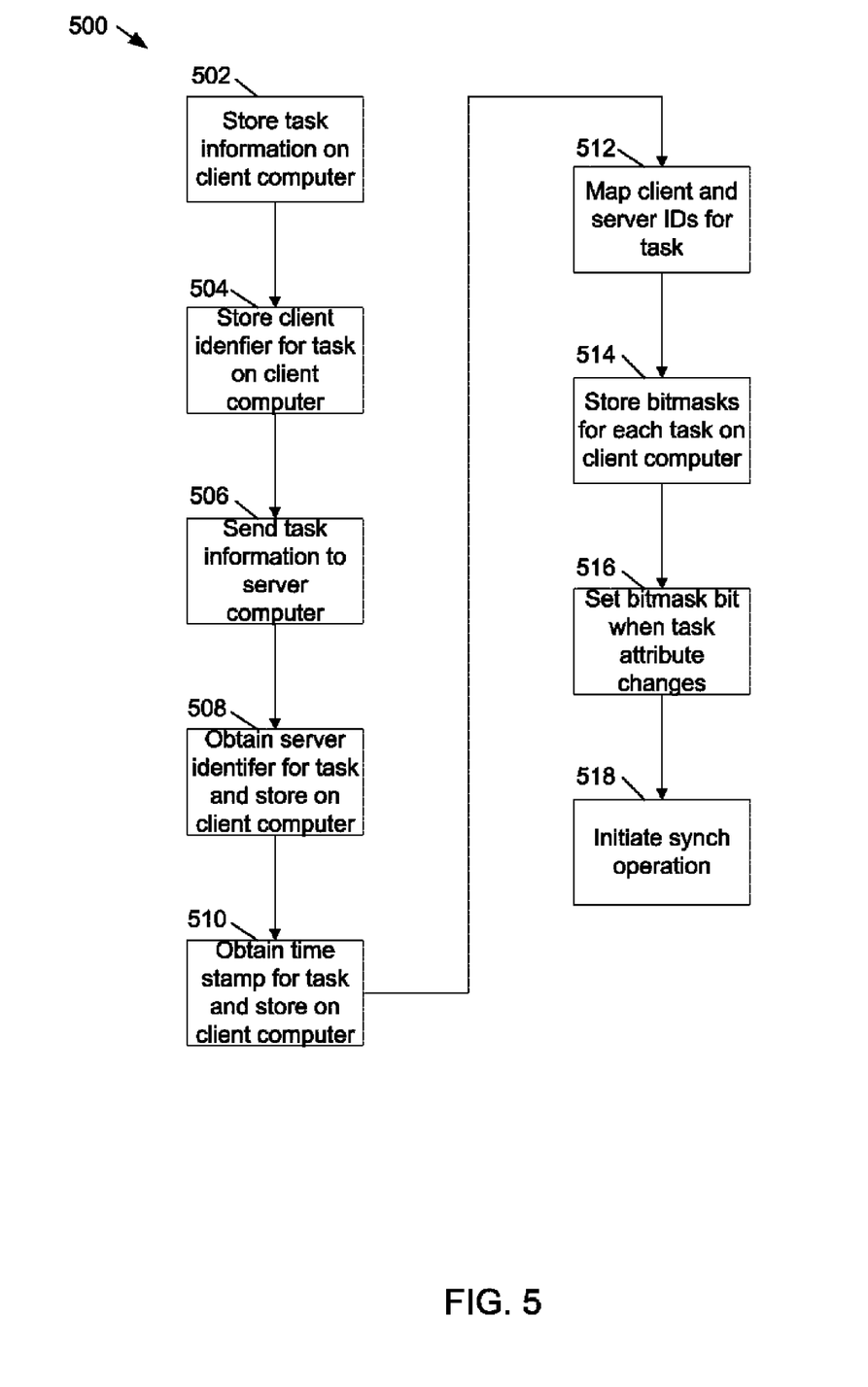
FIG. 5 shows a flowchart for an example method for resolving conflicts between interrelated data on a client computer and a server computer.

FIG. 5 is a flowchart showing a method 500 for resolving conflicts between interrelated data on a client computer and a server computer. At operation 502, task information is stored on the client computer. The task information is entered via a client computer application program, typically a project management application program, and includes one or more tasks and one or more attributes associated with each task. Attributes include information such as the name of the task, the start and completion dates of the task, the duration of the task, the priority of the task, etc. Each task has associated with it a unique client computer task management application identifier. The unique client computer task management application identifier is stored on the client at operation 504.

At operation 506, the task information is sent to the server computer, typically by publishing it to a document sharing and collaboration program running on the server computer. When the task information is stored on the server computer, the server computer assigns a unique server computer application identifier for each task. At operation 508, the unique server computer application identifier is obtained for each task and stored on the client computer.

When a task is stored on the server computer, a timestamp is also stored, indicating the date and time that the task was last modified on the server computer. At operation 510, the timestamp for the task is obtained from the server computer and stored on the client computer. At operation 512, the unique server computer application identifier for each task is mapped to the unique client computer task management application identifier for the task and the mappings are stored on the client computer.

When each task is created on the client computer, a changelist is also created. The changelist identifies attributes for the task that are to be synced with the server. A bitmask is created for each changelist, with each bit in a bitmask corresponding to an attribute to be synced. At operation 514 the bitmasks for each task are stored on the client computer. When a task is edited via the client computer task management application, one or more attributes are changed. At operation 516, a bit is set in the bitmask for the task for each attribute that is changed.

Periodically, particularly when tasks are edited on the client computer, the client computer initiates a sync operation to sync these changes with the server. The sync operation is initiated at operation 518.

Figure 6:
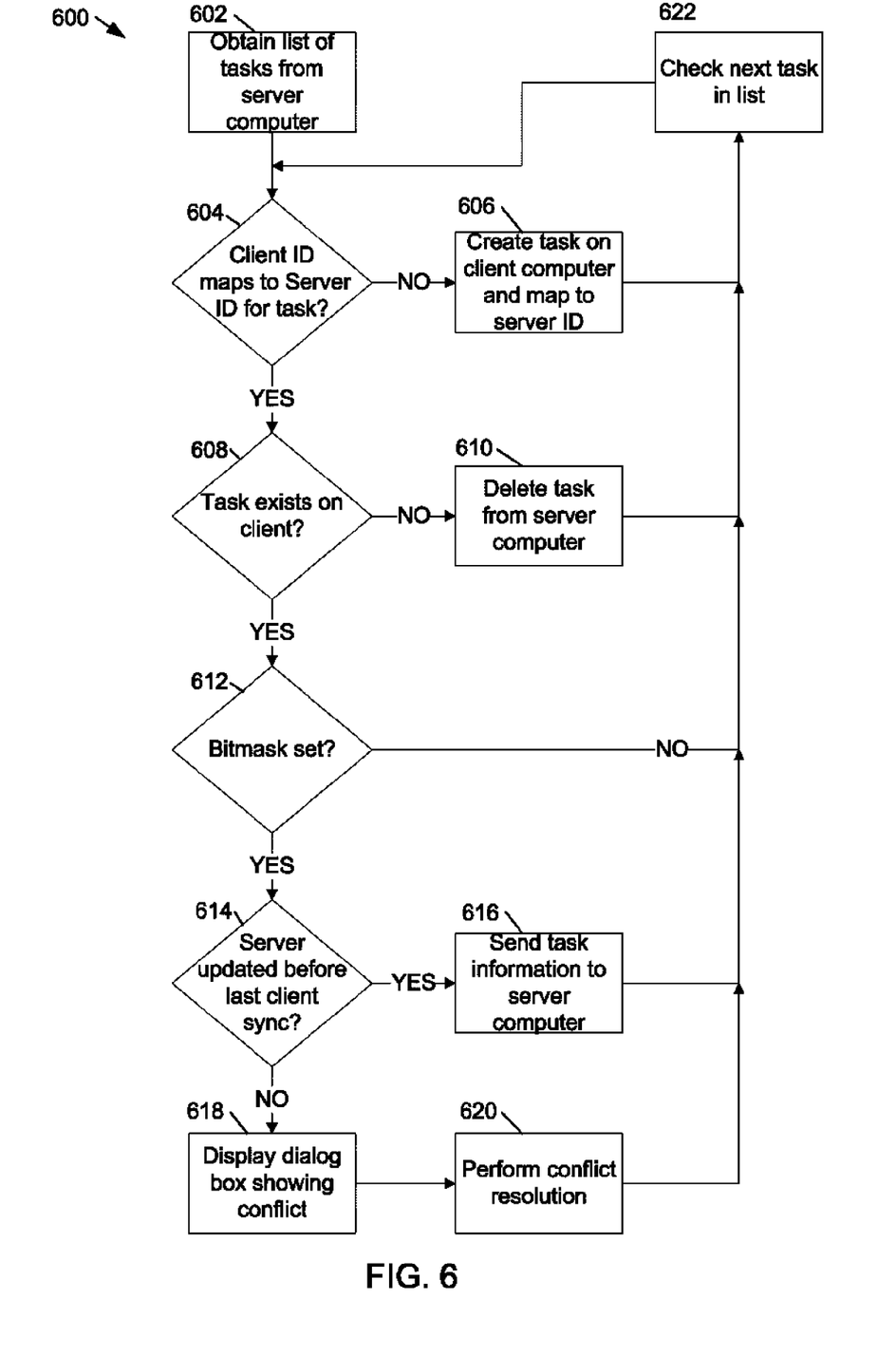
FIG. 6 shows a flowchart for an example sync operation.

FIG. 6 is a flowchart of an example sync operation. At operation 602 a list of tasks and attributes are obtained from the server computer. At operation 604, for each of the tasks obtained from the server computer, a determination is made as to whether the unique server computer application identifier for the task is mapped to the unique client computer task management application identifier for the task. For example, a determination is made whether the Microsoft Project ID for the task is mapped to the WSS ID for the task. If a task does not map, at operation 606 a new task is created on the client computer and mapped to unique server computer application identifier for the task.

If a task does map, at operation 608, a determination is made as whether the task exists on the client computer. If a task maps but does not exist on the client computer, it is an indication that the task was deleted from the client computer. Therefore, at operation 610, the task is deleted from the server computer so that the server computer is consistent with the client computer.

If the task both maps and exists on the client computer, a determination is made at operation 612 whether any bits in the bitmask for the task are set. If any of the bits in the bitmask for the task are set, indicating that at least one attribute for the task has been changed, a determination is made at operation 614 as to whether the server computer was updated before the last client computer sync. This determination is made by checking the date and time that the task was last modified on the server computer with the date and time that the client computer last initiated a sync operation. If the date and time that the task was last modified on the server computer is earlier than the date and time than the task was last modified on the client computer, indicating that the task was updated on the client computer and the server computer does not yet have this updated information, the updated task information is sent to the server computer at operation 616.

If a bitmask bit is set for the task and the server computer was updated after the last client sync, the client computer flags as conflicts all fields in which the bitmask bits are set and at operation 618 displays a dialog box to the user showing the conflict. At operation 620, the user manually performs conflict resolution by choosing one of the conflicting attributes. This is typically done via the dialog box that displays the conflict.

When conflict resolution is computed for a task or when operations 606, 610 or 616 have been completed if there is no conflict, control passes to operation 622 to check the next task and proceed with task 604 again, as discussed. Any transitive changes are automatically updated by the task management application, minimizing the conflicts presented to the user for resolution.

Figure 7:
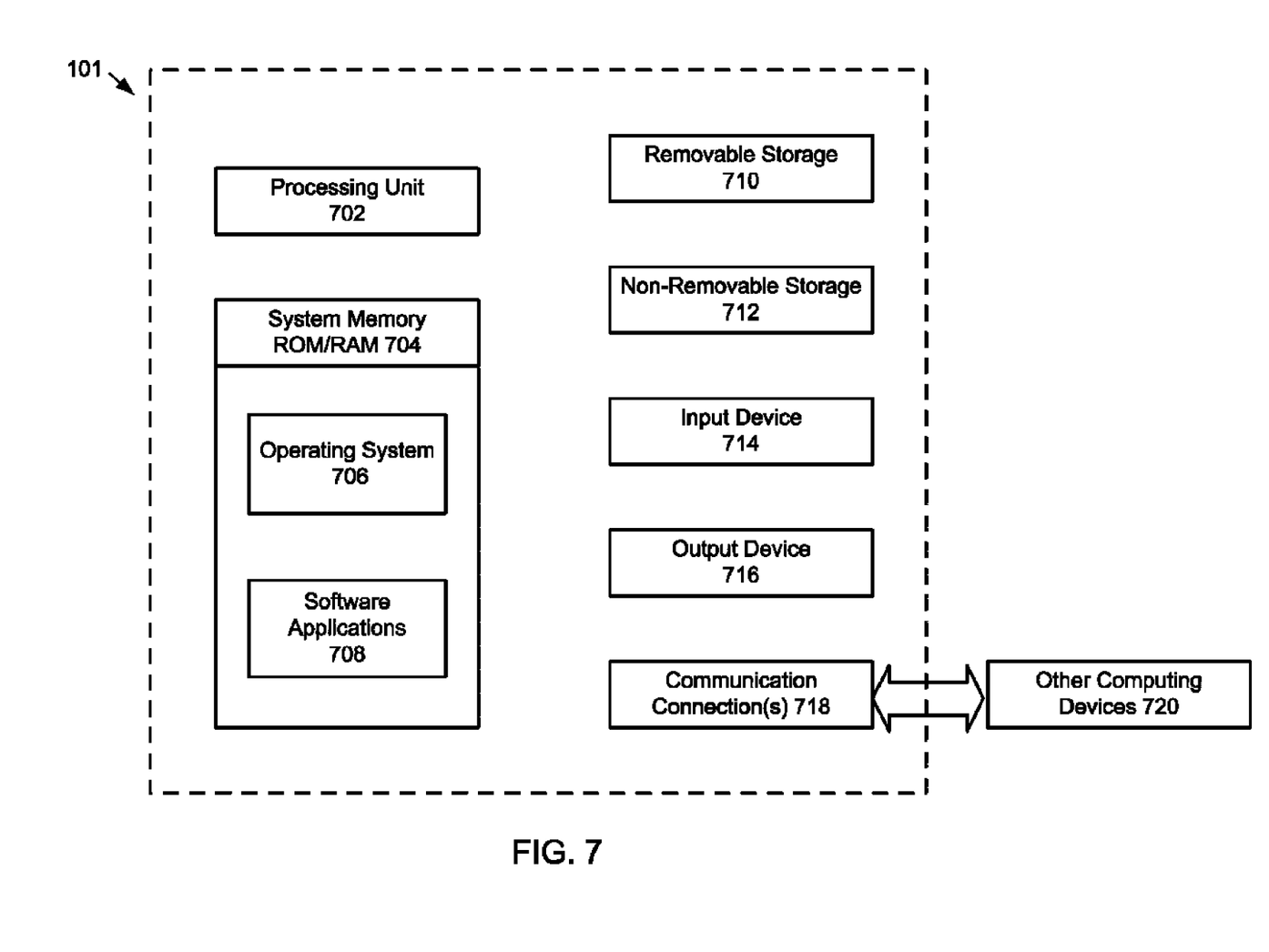
FIG. 7 shows an operating environment with a system in which conflicts can be resolved when synchronizing interrelated data stored on two computer systems.

With reference to FIG. 7, one exemplary system for implementing the invention includes a computing device, such as computing device 101. In a basic configuration, the computing device 101 typically includes at least one processing unit 702 and system memory 704. Depending on the exact configuration and type of computing device, the system memory 704 may be volatile (such as RAM), non-volatile (such as ROM, flash memory, etc.) or some combination of the two. System memory 704 typically includes an operating system 706 suitable for controlling the operation of a networked personal computer, such as the WINDOWS® operating systems from MICROSOFT CORPORATION of Redmond, Wash. or a server, such as Windows Sharepoint Server 2007, also from MICROSOFT CORPORATION of Redmond, Wash. The system memory 704 may also include one or more software applications 708 and may include program data.

The computing device 101 may have additional features or functionality. For example, the computing device 101 may also include additional data storage devices (removable and/or non-removable) such as, for example, magnetic disks, optical disks, or tape. Such additional storage is illustrated in FIG. 7 by removable storage 710 and non-removable storage 712. Computer storage media may include volatile and non-volatile, removable and non-removable media implemented in any method or technology for storage of information, such as computer readable instructions, data structures, program modules, or other data. System memory 704, removable storage 710 and non-removable storage 712 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 101. Any such computer storage media may be part of device 101. Computing device 101 may also have input device(s) 714 such as keyboard, mouse, pen, voice input device, touch input device, etc. Output device(s) 716 such as a display, speakers, printer, etc. may also be included. These devices are well known in the art and need not be discussed at length here.

The computing device 101 may also contain communication connections 718 that allow the device to communicate with other computing devices 720, such as over a network in a distributed computing environment, for example, an intranet or the Internet. Communication connection 718 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The various embodiments described above are provided by way of illustration only and should not be construed to limiting. Various modifications and changes that may be made to the embodiments described above without departing from the true spirit and scope of the disclosure.

What is claimed is:

1. A method for resolving conflicts between interrelated data on a client computer and a server computer, the method comprising:

publishing information for one or more tasks stored on the client computer to the server computer, each of the one or more tasks being a task for a project management software application, the information including one or more first attributes for each task, one of the one or more first attributes representing a unique client computer task identifier for the task;

obtaining from the server computer a unique server computer task identifier for each of the one or more tasks;

storing the unique server computer task identifier for each of the one or more tasks on the client computer;

for each of the one or more tasks stored on the client computer, mapping the unique server computer task identifier to the unique client computer task identifier;

receiving edits for the one or more tasks stored on the client computer, the edits resulting in updating of the one or more first attributes of the one or more tasks, at least one bit being set in a bitmask associated with each task for each task on the client computer in which at least one attribute of the one or more first attributes is changed;

initiating a sync operation comprising:

obtaining from the server computer a list of tasks for the client computer, each task in the list of tasks obtained from the server computer being a task for the project management software application, each task in the list of tasks including one or more second attributes associated with the task, the one or more second attributes including the unique server computer task identifier and a timestamp for the task, the timestamp corresponding to a date and time that the task was last modified on the server computer;

for each task on the list of tasks received from the server computer, determining if the unique server computer task identifier for the task maps to the unique client computer task identifier for the task;

for each task on the list of tasks received from the server computer for which the unique server computer task identifier maps to the unique client computer task identifier, determining if the task corresponding to the unique client computer task identifier exists on the client computer;

for each task on the list of tasks received from the server computer for which the unique server computer task identifier maps to the unique client computer task identifier, if the task corresponding to the client computer task identifier does not exist on the client computer, sending a request from the client computer to the server computer to delete the task from the server computer;

for each task on the list of tasks received from the server computer for which the unique server computer task identifier does not map to any unique client task identifier of the one or more tasks stored on the client computer, creating a new task in the project management software application on the client computer, creating a new unique client computer task identifier on the client computer for the new task and mapping the new unique client computer task identifier on the client computer for the new task to the unique server computer task identifier for the task; and for each task on the list of tasks received from the server computer for which the unique server computer task identifier maps to the unique client computer task identifier and the task does exist on the client computer, determining if any of the bits in the bitmask for the task are set, and if any of the bits in the bitmask for the task are set:

comparing the date and time that the task was last modified on the server computer with a date and time that the client computer initiated a last sync operation;

if the date and time that the task was last modified on the server computer is earlier than the date and time that the client computer initiated the last sync operation, sending task information to the server computer for each task in which any of the bits in the bitmask for the task are set; and if the date and time that the task was last modified on the server computer is later than the date and time that the client computer initiated the last sync operation, alerting a user on the client computer to a conflict in the sync operation and prompting the user to manually resolve the conflict.

2. The method of claim 1, wherein the step of alerting the user further comprises displaying a dialog box on the client computer, the dialog box alerting the user to the conflict in the one or more first attributes for the task.

3. The method of claim 2, wherein the user is prompted to manually resolve the conflict using the dialog box.

4. The method of claim 1 further comprising: if none of the bits in the bitmask is set for the task and the date and time that the task was last modified on the server computer is later than the date and time that the client computer initiated the last sync operation, updating the one or more first attributes of the task on the client computer so that the one or more first attributes for the task on the client computer are synchronized with the one or more second attributes for the task on the server computer.

5. The method of claim 1, wherein the bitmask for each task of the one or more tasks is reset after the task is synced.

6. The method of claim 1, wherein the bitmask is created for each task of the one or more tasks in the project management software application when the task is created.

7. The method of claim 1, wherein dependent tasks are automatically updated during the sync operation.

8. The method of claim 1, wherein the one or more first attributes include a task name, a start date of the task, an end date of the task, a percent completion of the task and an owner of the task.

9. The method of claim 1, wherein the user selects the one or more first attributes from a plurality of attributes available on the client computer and the server computer.

10. A first computing device comprising:
a processing unit and a memory, the memory storing instructions that when executed by the processing unit cause the first computing device to:
publish information for one or more tasks stored on the first computing device to a second computing device, each of the one or more tasks being a task for a project management software application, the information including one or more first attributes for each task, one of the one or more first attributes representing a unique first computing device task identifier for the task;
obtain from the second computing device a unique second computing device task identifier for each of the one or more tasks and store the unique second computing device task identifier for each of the one or more tasks on the first computing device;
for each of the one or more tasks stored on the first computing device, map the unique second computing device task identifier to the unique first computing device task identifier;
receive edits for the one or more tasks stored on the first computing device, the edits resulting in updating of the one or more first attributes of the one or more tasks, at least one bit being set in a bitmask associated with each task for each task on the first computing device in which at least one attribute of the one or more first attributes is changed;
initiate a sync operation comprising:
obtaining from the second computing device a list of tasks for the first computing device, each task in the list of tasks obtained from the second computing device being a task for the project management software application, each task in the list of tasks including one or more second attributes associated with the task, the one or more second attributes including the unique second computing device task identifier and a timestamp for the task, the timestamp corresponding to a date and time that the task was last modified on the second computing device;
for each task on the list of tasks received from the second computing device, determining if the unique second computing device task identifier for the task maps to the unique first computing device task identifier for the task;
for each task on the list of tasks received from the second computing device for which the unique second computing device task identifier maps to the unique first computing device task identifier, determining if the task corresponding to the unique first computing device task identifier exists on the first computing device;
for each task on the list of tasks received from the second computing device for which the unique second computing device task identifier maps to the unique first computing device task identifier, if the task corresponding to the unique first computing device task identifier does not exist on the first computing device, sending a request from the first computing device to the second computing device to delete the task from the second computing device;
for each task on the list of tasks received from the second computing device for which the unique second computing device task identifier does not map to any unique first computing device task identifier of the one or more tasks stored on the first computing device, creating a new task in the project management software application on the first computing device, creating a new unique first computing device task identifier on the first computing device for the new task and mapping the new unique first computing device task identifier on the first computing device for the new task to the unique second computing device task identifier for the task; and
for each task on the list of tasks received from the second computing device for which the unique second computing device task identifier maps to the unique first computing device task identifier and the task does exist on the first computing device, determining if any of the bits in the bitmask for the task are set, and if any of the bits in the bitmask for the task are set:
comparing the date and time that the task was last modified on the second computing device with a date and time that the first computing device initiated a last sync operation;
if the date and time that the task was last modified on the second computing device is earlier than the date and time that the first computing device initiated the last sync operation, sending task information to the second computing device for each task in which any of the bits in the bitmask for the task are set; and
if the date and time that the task was last modified on the second computing device is later than the date and time that the first computing device initiated the last sync operation, alerting a user on the first computing device to a conflict in the sync operation and prompting the user to manually resolve the conflict.

11. The first computing device of claim 10, wherein the step of alerting the user further comprises displaying a dialog box on the first computing device, the dialog box alerting the user to the conflict in the one or more first attributes for the task.

12. The first computing device of claim 11, wherein the user is prompted to manually resolve the conflict using the dialog box.

13. The first computing device of claim 10 further comprising: if none of the bits in the bitmask is set for the task and the date and time that the task was last modified on the second computing device is later than the date and time that the first computing device initiated the last sync operation, updating the one or more first attributes of the task on the first computing device so that the one or more first attributes for the task on the first computing device are synchronized with the one or more second attributes for the task on the second computing device.

14. The first computing device of claim 10, wherein the sync operation is initiated from the second computing device.

15. The first computing device of claim 10, wherein the bitmask for each task is reset on the second computing device after the sync operation is completed.

16. The first computing device of claim 10, wherein the first computing device and the second computing device are both client computers.

17. The first computing device of claim 10, wherein the first computing device and the second computing device are both server computers.

18. A computer-readable storage memory comprising instructions that, when executed by a client computer, cause the client computer to:
publish information for one or more tasks stored on the client computer to a server computer, each of the one or more tasks being a task a project management software application, the information including one or more first attributes for each task, one of the one or more first attributes representing a unique client computer task identifier for the task;
obtain from the server computer a unique server computer task identifier for each of the one or more tasks;
store the unique server computer task identifier for each of the one or more tasks on the client computer;
for each of the one or more tasks stored on the client computer, map the unique server computer task identifier to the unique client computer task identifier;
receive edits for the one or more tasks stored on the client computer, the edits resulting in updating of the one or more first attributes of the one or more tasks, at least one bit being set in a bitmask associated with each task for each task on the client computer in which at least one attribute of the one or more first attributes is changed;
initiate a sync operation comprising:
obtaining from the server computer a list of tasks for the client computer, each task in the list of tasks obtained from the server computer being a task for the project management software application, each task in the list of tasks including one or more second attributes associated with the task, the one or more second attributes including the unique server computer task identifier and a timestamp for the task, the timestamp corresponding to a date and time that the task was last modified on the server computer;
for each task on the list of tasks received from the server computer, determining if the unique server computer task identifier for the task maps to the unique client computer task identifier for the task;
for each task on the list of tasks received from the server computer for which the unique server computer task identifier maps to the unique client computer task identifier, determining if the task corresponding to the unique client computer task identifier exists on the client computer;
for each task on the list of tasks received from the server computer for which the unique server computer task identifier maps to the unique client computer task identifier, if the task corresponding to the client computer task identifier does not exist on the client computer, sending a request from the client computer to the server computer to delete the task from the server computer;
for each task on the list of tasks received from the server computer for which the unique server computer task identifier does not map to any unique client task identifier of the one or more tasks stored on the client computer, creating a new task in the project management software application on the client computer, creating a new unique client computer task identifier on the client computer for the new task and mapping the new unique client computer task identifier on the client computer for the new task to the unique server computer task identifier for the task; and
for each task on the list of tasks received from the server computer for which the unique server computer task identifier maps to the unique client computer task identifier and the task does exist on the client computer, determining if any of the bits in the bitmask for the task are set, and if any of the bits in the bitmask for the task are set:
comparing the date and time that the task was last modified on the server computer with a date and time that the client computer initiated a last sync operation;
if the date and time that the task was last modified on the server computer is earlier than the date and time that the client computer initiated the last sync operation, sending task information to the server computer for each task in which any of the bits in the bitmask for the task are set; and
if the date and time that the task was last modified on the server computer is later than the date and time that the client computer initiated the last sync operation, alerting a user on the client computer to a conflict in the sync operation and prompting the user to manually resolve the conflict.

* * * * *